(12) United States Patent
Ishii et al.

(10) Patent No.: US 8,467,067 B2
(45) Date of Patent: Jun. 18, 2013

(54) DYNAMIC LIGHT-SCATTERING MEASURING APPARATUS USING LOW-COHERENCE LIGHT SOURCE AND LIGHT-SCATTERING MEASURING METHOD OF USING THE APPARATUS

(75) Inventors: Katsuhiro Ishii, Hamamatsu (JP); Sohichiro Nakamura, Minami-ashigara (JP); Yuki Sato, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 296 days.

(21) Appl. No.: 12/828,878

(22) Filed: Jul. 1, 2010

(65) Prior Publication Data

US 2011/0001969 A1 Jan. 6, 2011

(30) Foreign Application Priority Data

Jul. 3, 2009 (JP) ................. 2009-159307

(51) Int. Cl.
*G01B 9/02* (2006.01)
(52) U.S. Cl.
USPC .......................... 356/450; 356/479
(58) Field of Classification Search
USPC .................. 356/450, 477, 479, 481
See application file for complete search history.

(56) References Cited

U.S. PATENT DOCUMENTS

| | | | | |
|---|---|---|---|---|
| 3,825,346 A | * | 7/1974 | Rizzo | 356/28.5 |
| 6,037,579 A | * | 3/2000 | Chan et al. | 250/216 |
| 7,362,444 B2 | * | 4/2008 | Izatt et al. | 356/479 |
| 7,508,523 B2 | * | 3/2009 | Chang et al. | 356/479 |
| 8,184,298 B2 | * | 5/2012 | Popescu et al. | 356/450 |
| 2009/0125242 A1 | * | 5/2009 | Choi et al. | 702/19 |

FOREIGN PATENT DOCUMENTS

| | | |
|---|---|---|
| JP | 9-159607 A | 6/1997 |
| JP | 2003-106979 A | 4/2003 |
| JP | 2005-121600 A | 5/2005 |
| JP | 2008-39539 A | 2/2008 |
| WO | 2009036418 A1 | 3/2009 |

OTHER PUBLICATIONS

Babu Varghese, et al.; "High angle phase modulated low coherence interferometry for path length resolved Doppler measurements of multiply scattered light"; ScienceDirect; Optics Communications; vol. 281, No. 3; (2008); pp. 494-498.
Japanese Office Action dated Mar. 12, 2013 for corresponding Japanese Patent Application No. 2009-159307.

* cited by examiner

*Primary Examiner* — Michael A Lyons
(74) *Attorney, Agent, or Firm* — Sughrue Mion, PLLC

(57) ABSTRACT

There is provided a dynamic light-scattering measuring apparatus including: a Mach-Zehnder interferometer; and a low-coherence light source. Further, there is provided a method for measuring light-scattering intensity of particles in a medium, including the steps of: providing a Mach-Zehnder interferometer; and measuring light-scattering intensity from light emitted from a low-coherence light source, in accordance with a dynamic light-scattering intensity measuring process.

3 Claims, 5 Drawing Sheets

(a) Diluted system
(one-time scattering)

(b) Concentrated system
(multiple scattering)

DYNAMIC LIGHT-SCATTERING MEASURING APPARATUS USING LOW-COHERENCE LIGHT SOURCE AND LIGHT-SCATTERING MEASURING METHOD OF USING THE APPARATUS

FIELD OF THE INVENTION

The present invention relates to a dynamic light-scattering measuring apparatus using a low-coherence light source and a light-scattering measuring method.

BACKGROUND OF THE INVENTION

A dynamic light-scattering measuring method has already become an established technology, and a measuring device that measures a particle size of a fine particle by utilizing the method is widely used. This method has advantages including a small number of necessary parameters, nondestructive measurement, and easy-to-use handling. The dynamic light-scattering measuring method realizes the highly accurate measurement under an environment in which a single scattering theory, that is, a theory that the light scattered once is detectable without scattering another particle again can be applied in principle. For example, the particle size is accurately measured in a dilute solution containing the particle of 0.01% or less. However, depending on the particle size and a refractive index, when the particle containing solution has a high concentration to be not able to ignore an influence of multiple scattering, that is, a phenomenon that the light scattered once is scattered again by another particle, a dynamic particle characteristic that is necessary for the conventional measuring devices based on the single scattering theory differs from actual one.

FIG. 5 is an explanatory view illustrating modeling of the light-scattering phenomenon due to a difference in particle concentration. Generally, in a diluted system, it can be assumed that a particle 73 does freely Brownian motion and the scattering of light 71 occurs only once (see FIG. 5(a)). On the other hand, in a concentrated system, at least one-time scattering is mixed (see FIG. 5(b)). Therefore, the measurement based on the single scattering cannot be performed because the phenomenon is matched with neither the theory nor the actual measurement.

Recently, there is reported the result in which a time correlation function and a power spectrum of the scattering light are measured using a Michelson interferometer as a dynamic light-scattering measuring apparatus 80 (see FIG. 6). In the Michelson interferometer, a low-coherence light source is used (see JP-A-2003-106979 ("JP-A" means unexamined published Japanese patent application) and JP-A-2005-121600). In FIG. 6, the dynamic light-scattering measuring apparatus 80 includes a low-coherence light source 87, a lens 88, optical fibers 89a to 89d, a photocoupler 91, a collimator 81, a mirror 82, an oscillating element (piezoelectric oscillator) 83, a sample cell (scattering medium) 84, a collector 85, and a spectrum analyzer (detector) 86. The use of the apparatus 80 in which the Michelson interferometer is utilized can extract only a scattering light component from a region that is specified substantially equal to an optical path length of reference light, so that only a single scattering component of the scattering light can selectively be detected from a high-concentration medium. The spectrum and time correlation function of the scattering light fluctuating over time are obtained based on the single scattering component, which allows the measurement of the dynamic characteristic of the high-concentration medium particle.

SUMMARY OF THE INVENTION

The present invention resides in a dynamic light-scattering measuring apparatus including: a Mach-Zehnder interferometer; and a low-coherence light source.

Further, the present invention resides in a method for measuring light-scattering intensity of particles in a medium, including the steps of: providing a Mach-Zehnder interferometer; and measuring light-scattering intensity from light emitted from a low-coherence light source, in accordance with a dynamic light-scattering intensity measuring process.

Other and further features and advantages of the invention will appear more fully from the following description, appropriately referring to the accompanying drawings.

Figure 1:
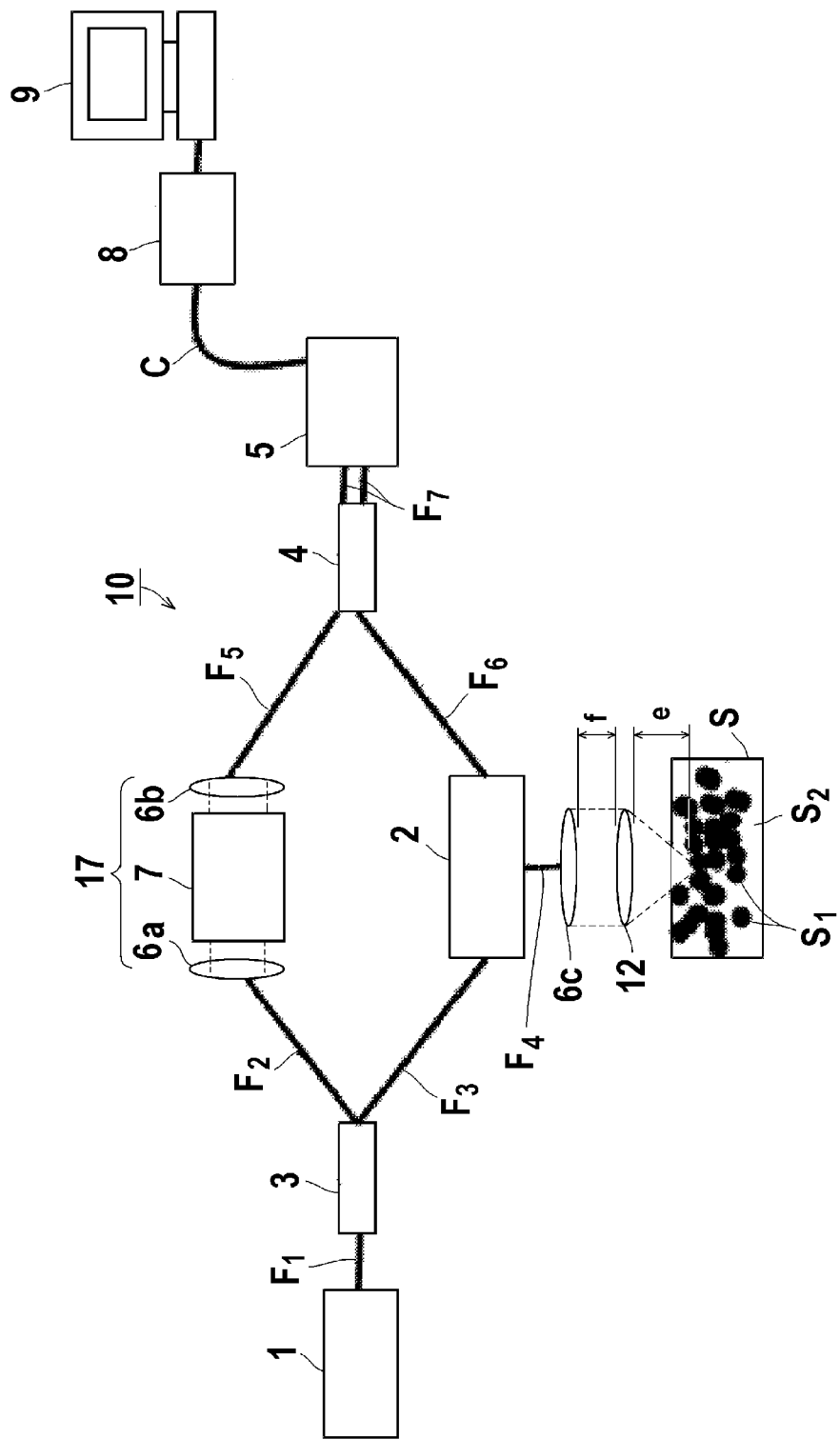
FIG. 1 is a schematic diagram illustrating a configuration of a dynamic light-scattering measuring apparatus according to a preferred embodiment of the present invention.

| | |
|---|---|
| 1 | SLD light source |
| 2 | Circulator |
| 3 | Photocoupler (optical branching mechanism: first photocoupler) |
| 4 | Photocoupler (optical joint mechanism: second photocoupler) |
| 5 | Balance detector (detector) |
| 6a to 6c | Collimator lens |
| 7 | Phase modulator (modulator) |
| 8 | A/D board (electric signal reading unit) |
| 9 | PC (data processing and analyzing unit) |
| 10 | Apparatus of including Mach-Zehnder interferometer |
| $F_1$ to $F_7$ | Optical fibers |
| S | Scattering medium (sample) |
| C | BNC cable |
| 12 | Objective lens (light collecting device) |
| 17 | Modulating unit |
| 71 | Light |
| 73 | Particle |
| 80 | Apparatus including Michelson interferometer |
| 81 | Collimator |
| 82 | Millar |
| 83 | Piezoelectric oscillator |
| 84 | Scattering medium (sample) |
| 85 | Collector |
| 86 | Spectrum analyzer (detector) |
| 87 | SLD light source |
| 88 | Lens |
| 89a to 89d | Optical fiber |
| 91 | Photocoupler |

DETAILED DESCRIPTION OF THE INVENTION

According to the confirmation performed by the inventors, the apparatus in which the Michelson interferometer is used can measure the particle size of hundred nanometers or more at the most when the polystyrene-water dispersion solution having the concentration of 10% by mass is used. Even if the measurement is performed while light source intensity is increased, supersaturation of the detector occurs, and the scattering light intensity is increased only in proportion to the light source intensity, whereby the measurement cannot be performed. Therefore, not only the particle size of less than hundred nanometers cannot be measured, but also a multi-disperse state containing fine particles whose particle size of hundred nanometers or more and coarse particles is difficult to quantify.

As a result of earnest study, the inventors found the following fact. That is, a Mach-Zehnder interferometer is incorporated in the dynamic light-scattering measuring apparatus provided with the low-coherence light source, and a measuring condition, a fiber branching ratio, and a microscope optical system are preferably adjusted. Therefore, the particle size can be measured in the high-concentration sample of the fine particle (for example, a polystyrene-water dispersion solution having the particle size lower than 100 nm and the concentration of 10% by mass) in which conventionally the measurement cannot be performed with the Michelson interferometer due to the weak signal. Further, the supersaturation (a state where sensitivity improvement realized by increasing light source intensity is interrupted by input light quantity limit of the detector) of the detector is prevented if needed, and detection intensity of the scattering light is increased to achieve the large sensitivity improvement compared with the conventional technique. The present invention is made based on the above-described finding.

Thus, the present invention addresses to the provision of a dynamic light-scattering measurement that can accurately perform the measurement (of the particle size, condensed state, and the like) of the particle size, even in the high-concentration fine particle solution containing the fine particles. Further, the present invention addresses to the provision of a measuring method using the above apparatus.

Hereinafter, an embodiment of the present invention will be described in detail.

(1) A dynamic light-scattering measuring apparatus including: a Mach-Zehnder interferometer; and a low-coherence light source.

(2) The dynamic light-scattering measuring apparatus as described in the above item (1) including: a first photocoupler for dividing light emitted from the low-coherence light source into two pieces, thereby one of the divided pieces of light to be used as reference light, the other divided piece of light to be used as scattering light through a medium containing particles; and a second photocoupler for combining the divided pieces of light.

(3) The dynamic light-scattering measuring apparatus as described in the above item (1), wherein the medium containing the particles is a dispersion solution containing particles having particle sizes lower than 100 nm or a dispersion solution in a multi-disperse state including particles having particle sizes lower than 100 nm.

(4) The dynamic light-scattering measuring apparatus as described in the above item (1), further comprising a phase modulator provided in a way of the path for the reference light.

(5) A method for measuring light-scattering intensity of particles in a medium, including the steps of: providing a Mach-Zehnder interferometer; and measuring light-scattering intensity from light emitted from a low-coherence light source, in accordance with a dynamic light-scattering intensity measuring process.

(6) The light-scattering intensity measuring method as described in the above item (5), wherein the light emitted from the low-coherence light source is divided into two pieces of light at a first photocoupler, one of the divided pieces of light is used as reference light, the other divided piece of light is used as scattering light through the medium containing the particles, the divided pieces of light is combined at a second photocoupler, and the measurement is performed by interference between the divided pieces of light.

(7) The light-scattering intensity measuring method as described in the above item (5), wherein the medium containing the particles is a dispersion solution containing particles having particle sizes lower than 100 nm or a dispersion solution in a multi-disperse state including particles having particle sizes lower than 100 nm.

In the present invention, the low-coherence light source means a light source that emits the light having a coherence length of 0.1 to 1000 μm, and preferably the coherence length ranges from 1 to 100 μm. Further, the term "multi-disperse state" is defined as the state of dispersion including plural peaks in particle size distribution.

FIG. 1 is a schematic diagram illustrating a configuration of a dynamic light-scattering measuring apparatus according to an embodiment of the present invention in which a Mach-Zehnder interferometer is used. A low-coherence light source (SLD; Super Luminescent Diode) 1 is used as a light source of a dynamic light-scattering measuring apparatus 10. The dynamic light-scattering measuring apparatus 10 includes optical fibers (optical propagation path) $F_1$, $F_2$, $F_3$, $F_4$, $F_5$, $F_6$, and $F_7$, a photocoupler (optical branching mechanism: first photocoupler) 3, collimator lenses (joint device between fiber and air in optical propagation path) 6a, 6b, and 6c, a phase modulator (modulator) 7, a circulator (optical path changing device, light coming from optical fiber $F_3$ is passed through optical fiber $F_4$ while light coming from optical fiber $F_4$ is led to optical fiber $F_6$) 2, an objective lens (light collecting device) 12, a photocoupler (optical joint mechanism: second photocoupler) 4, a balance detector (detector) 5, a BNC cable (electric cable) C, an A/D board (electric signal reading unit) 8, and a personal computer (PC) (data processing and analyzing unit) 9. In a scattering medium sample S, particles $S_1$ are contained in a medium $S_2$.

There is no particular limitation to a wavelength of the light emitted from the SLD light source 1 used in the embodiment. For example, preferably the wavelength ranges from 0.125 to 2 μm, and more preferably the wavelength ranges from 0.250 to 1.5 μm. For example, a spatial propagation technique may be used instead of the optical fibers $F_1$ to $F_7$. A branching ratio of the photocoupler 3 can be changed according to a measuring object. A phase modulating unit 17 including the collimator lenses 6a and 6b and the modulator 7 may have either a mechanism that modulates the light in the space or a mechanism that modulates the light in the fiber. Alternatively, the phase modulating unit 17 includes the circulator 2, the optical fiber $F_4$, and the objective lens 12, which are used in the other optical path, and the sample (scattering medium) S may be replaced with a mirror that can be oscillated. The objective lens 12 can be changed according to the measuring system. The objective lens needs not to be used for the large particle size. An attenuator may be interposed between the optical fiber F2 and the optical fiber F5 to adjust a light quantity if needed. The A/D board 8 and the PC 9 can be replaced with a spectrum analyzer or the like. A coupler having a ratio of 1:1 can be used as the circulator 2, and an incident optical path and an output optical path can be separated from each other.

The light emitted from the low-coherence light source 1 is incident to the photocoupler 3 through the optical fiber $F_1$, and the light is divided into two pieces of light by the photocoupler 3. One of the divided pieces of light is formed into a parallel light through the optical fiber $F_2$ by the collimator lens 6a, enters the optical fiber $F_5$ through the phase modulator 7 by the collimator lens 6b, and reaches the photocoupler 4 through the optical fiber F5. One of the divided pieces of light is referred to as "reference light". Assuming that $d_{ref}$ is an optical path length of one way from the photocoupler 3 to the photocoupler 4, the optical path of the reference light has the optical path length $d_{ref}$.

The other piece of light divided by the photocoupler 3 is passed through the optical fiber $F_3$, passed through the optical fiber $F_4$ by the circulator 2, formed into a parallel light by the collimator 6c, and caused to be incident to the scattering medium S in the sample cell by the collector 12. The back scattering light from the scattering medium is passed through the collector 12, the collimator lens 6c, and the optical fiber F4 again and caused to be incident to the photocoupler 4 through the optical fiber $F_6$ by the circulator 2. The other piece of light is referred to as "scattering light". When dsca is defined as a sum of an optical path length $d_1$ (somewhere in the scattering medium may be defined by the measuring condition or measuring object and, for example, the optical path length to a focusing position can be determined) from the photocoupler 3 to a point at which the scattering occurs in the scattering medium S and an optical path length $d_2$ to the photocoupler 4 from the point at which the scattering occurs in the scattering medium S, the optical path of the scattering light has the optical path length $d_{sca}=d_1+d_2$.

The reference light and scattering light, which are incident to the photocoupler 4, are incident to the light-receiving diode (PD; Photo Detector) 5 through the optical fiber F7, electric conversion signals of the reference light and scattering light are passed through the BNC cable C, and a power spectrum of light interfering intensity is output on the personal computer 9 through the A/D board 8. The power spectrum is referred to as "heterodyne spectrum". On the other hand, a power spectrum, which is obtained by detecting intensity of only the scattering light is detected while the optical path of the reference light is blocked, is referred to as "homodyne spectrum". The coherence function of the low-coherence light source, the power spectrum of the interfering light intensity, and the scattering light spectrum, which are associated with the sequences of pieces of measurement and computations, can be referred to in detail by JP-A-2005-121600.

In the present invention, the measuring apparatus and the measuring method are not limited to the above embodiment. For example, a space propagation type interferometer may be used instead of the interferometer in which the optical fiber is used. Additionally, various changes can be made.

Preferably, in order to increase detector saturation and scattering light intensity, which are generated in increasing the light source intensity, a coupler branching ratio is adjusted or a microscope optical system is combined.

In a preferred embodiment of the present invention, not only the particle size can be measured with extremely high accuracy in fine particles having diameters lower than 100 nm (practically more than 10 nm) a high-concentration sample thereof, but also the particle size can widely be measured in the multi-disperse state containing particles whose diameters are lower than 100 nm and particles whose diameters are not lower than 100 nm or a back scattering coefficient of the multi-disperse material can be measured and computed and a diffusion coefficient of the multi-disperse material can be computed.

A preferred embodiment of the present invention can provide a low-coherence dynamic light-scattering measuring apparatus in which the supersaturation of the detector is prevented while sensitivity is enhanced about 100 to 1000 times or more the conventional apparatus whose scattering light intensity is increased.

In a preferred embodiment of the present invention, a condensed state under the high-concentration condition (although there is no particular limitation to the concentration, for example, the fine particle dispersion solution having the concentration as high as 10% by mass or more (practically 50% by mass or less)) in pigment dispersion materials such as a color filter and ink for inkjet can be quantified, and quality control and process control can be performed by utilizing the quantification of the condensed state.

In a preferred embodiment of the present invention, both an inorganic particle and an organic particle are not used as the measuring object. A preferred embodiment of the present invention can be applied to the light scattering analysis for evaluating a behavior of the high-concentration fine particle in various fields such as a magnetic particle used in the recording medium and various particles used in the fields of medical procedure and biotechnology.

A preferred embodiment of the present invention can be applied not only to analysis of the particle, but also to analysis of a gel structure or a macromolecular structure in a solution in which the multiple scattering or the fluctuation in concentration occurs.

As described above, the dynamic light-scattering measurement apparatus of the present invention involves advantages that the measurement (of the particle size, condensed state, and the like) of the particle size can accurately be performed, even in a high-concentration fine particle solution containing the particles e.g. having the diameters of 100 nm or less which can not be measured with the conventional technique.

EXAMPLES

The present invention will be described in more detail based on the following examples, but the invention is not intended to be limited thereto.
[Production of Optical System]
An optical system was produced based on the configuration diagram of FIG. 1. The sample S was measured while accommodated in a sample cell.
[Preparation of Polystyrene Suspension Solution]
A commercially available polystyrene suspension solution was bought, and the particle size was evaluated with a transmission electron microscope. The polystyrene particles contained in a suspension solution A had a central particle size of 99 nm, and the polystyrene particles contained in a suspension solution B had a central particle size of 13 nm. A sample having a central particle size of 99 nm, a sample having a central particle size 59 nm, and a sample having a central particle size 23 nm were mixed with a mass ratio of 0.007: 0.03:1, and the mixture was used as a suspension solution C prepared in a similar manner. The concentration of the polystyrene particles was set to 10% by mass in each of the polystyrene suspension A to C.

Examples 1 to 3

In the polystyrene suspension A to C, the particle size was measured in the following measurement procedure with the dynamic light-scattering measuring apparatus (apparatus having the configuration of FIG. 1). The focusing position was moved to a point at a depth of about 100 mm from an interface between the sample cell and the solution, the optical path length of the scattering light or the optical path length of the reference light was adjusted such that $d=d_{sca}$ was obtained, and the power spectrum was measured. Then, the particle size distribution was analyzed with respect to the spectrum around modulated frequency by a CONTIN method.

Figure 2:
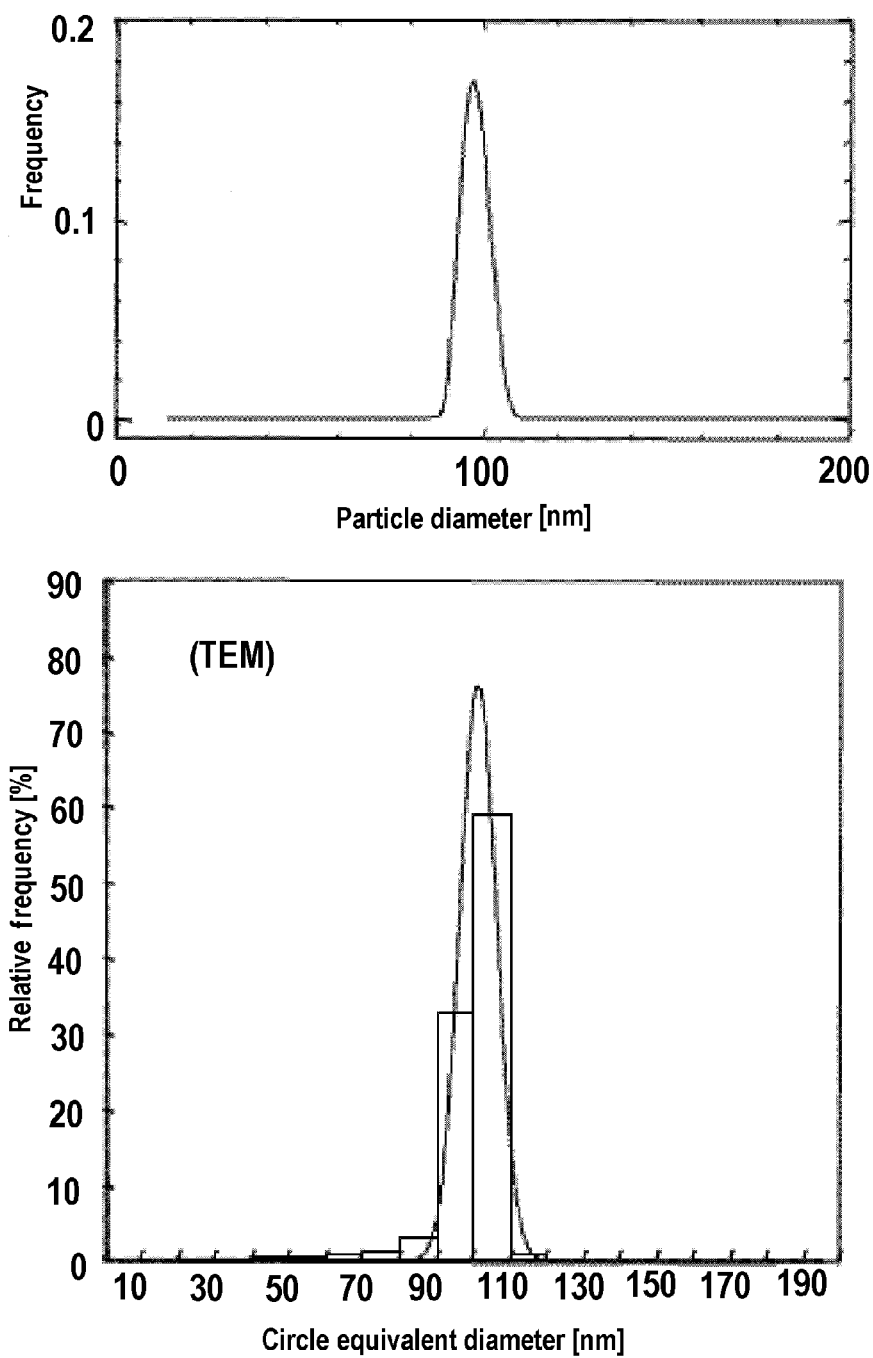
FIG. 2 is a graph illustrating a particle size distribution of a suspension solution A measured in example.
Figure 3:
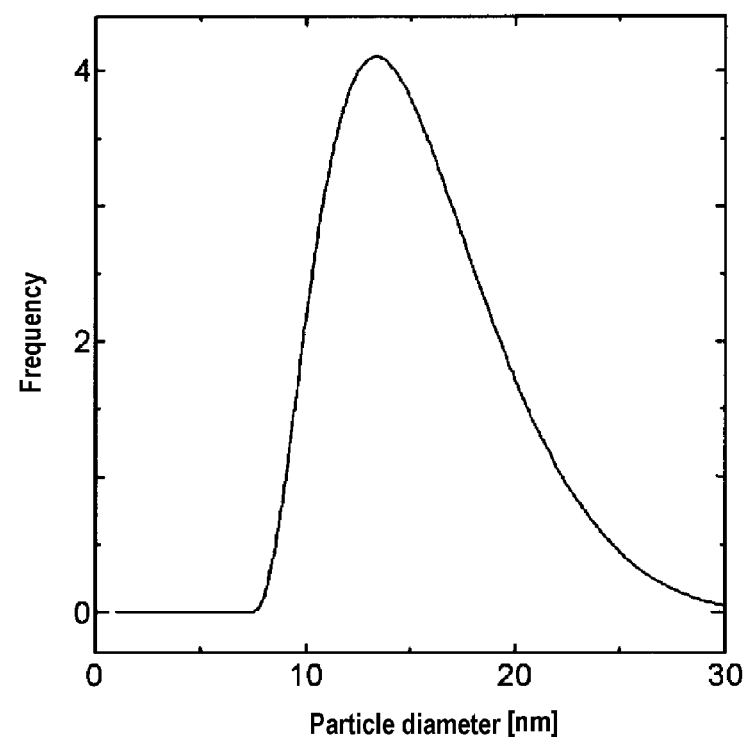
FIG. 3 is a graph illustrating a particle size distribution of a suspension solution B measured in example.
Figure 3:
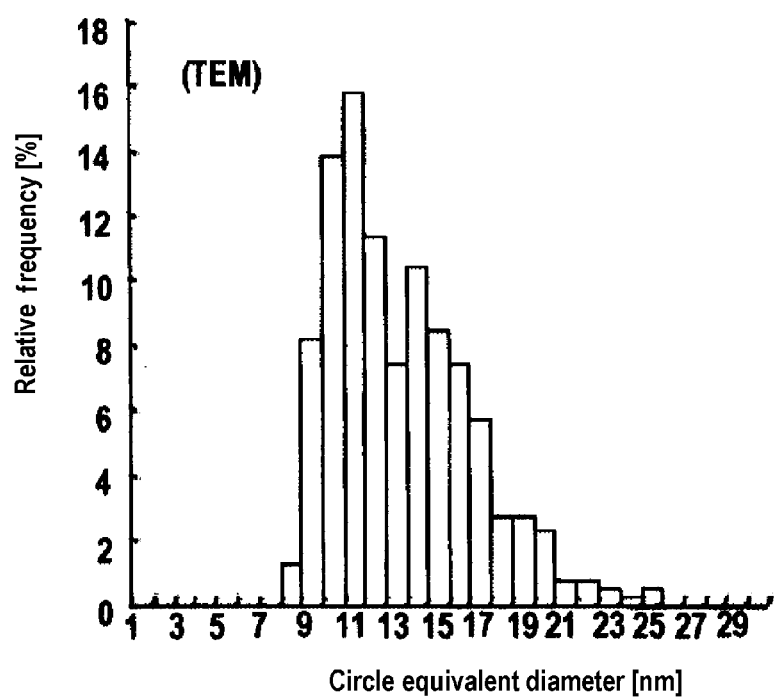
Figure 4:
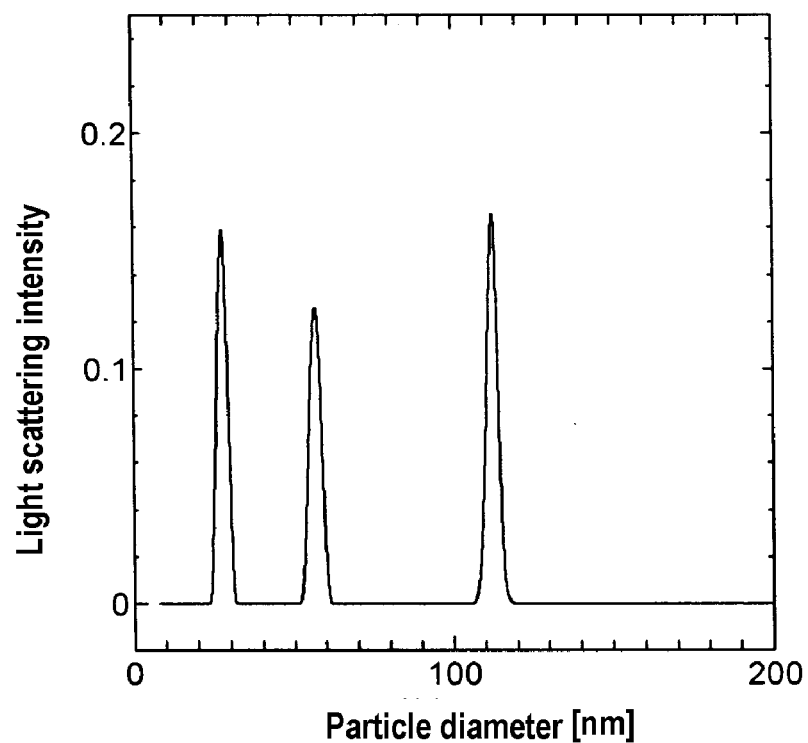
FIG. 4 is a graph illustrating a particle size distribution of a suspension solution C measured in example.
Figure 5:
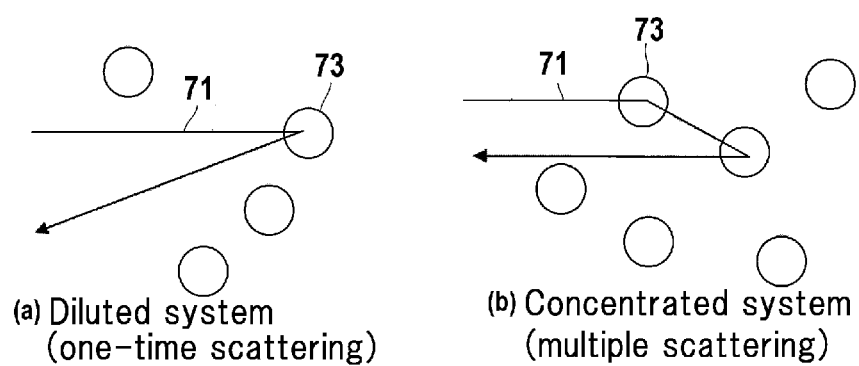
FIG. 5 is an explanatory view illustrating modeling of a light-scattering phenomenon due to a difference in particle concentration.
Figure 6:
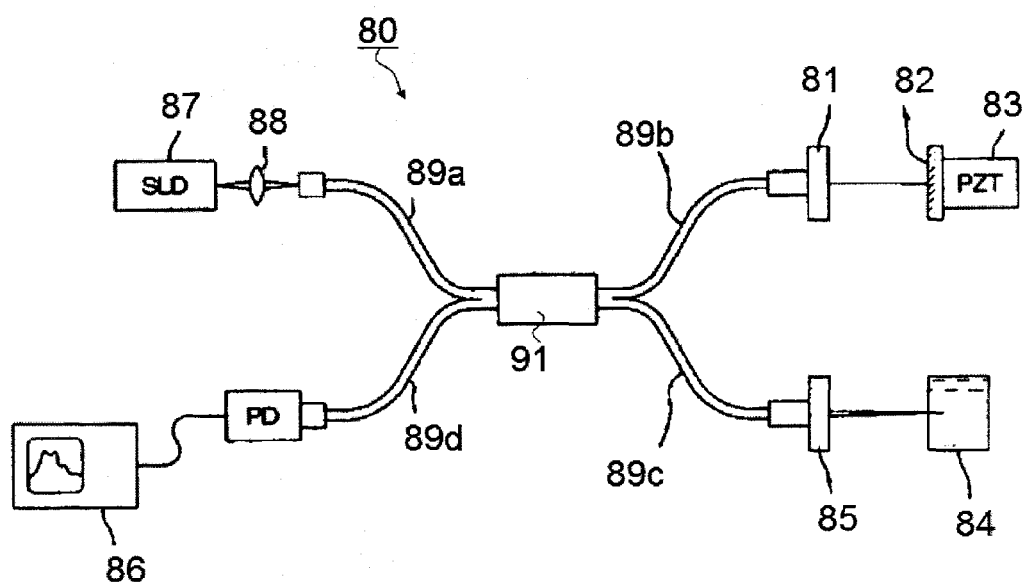
FIG. 6 is a configuration diagram of a Michelson interferometer disclosed in JP-A-2005-121600.

FIGS. 2 to 4 and Table 1 illustrate the results. The particle size distribution measured with the transmission electron microscope is illustrated in lower-stage graphs of FIGS. 2 and 3.

Comparative Example

The particle size was measured in the manner similar to that of Example 1 except that the interferometer of the measuring apparatus was replaced with the apparatus in which the Michelson interferometer of FIG. 1 of JP-A-2005-121600 was used. Table 1 illustrates the measurement result.

TABLE 1

|  | Sample | Average particle diameter (nm) | Concentration (mass %) | Availability of measurement*1 |
|---|---|---|---|---|
| Example 1 | Suspension A | 99 | 10 | Available |
| Example 2 | Suspension B | 13 | 10 | Available |
| Example 3 | Suspension C | –*2 | 10 | Available |
| Comparative Example 1 | Suspension A | 99 | 10 | Not available |

*1 Available: Average particle size can be measured.
Not available: Average particle size cannot be measured.
*2 Mixture in which the particles having the central particle sizes of 99 nm, 59 nm, and 23 nm were mixed with the mass ratio of 0.007:0.03:1, and the particle size distribution of the mixture was obtained.

As illustrated in Table 1, in Example, the particle having the particle size lower than 100 nm was able to be accurately measured in the polystyrene suspension solution having the concentration as high as about 10% by mass. On the other hand, in Comparative Example, the signal was buried in a noise, and the particle having the particle size lower than 100 nm was not able to be measured.

Having described our invention as related to the present embodiments, it is our intention that the invention not be limited by any of the details of the description, unless otherwise specified, but rather be construed broadly within its spirit and scope as set out in the accompanying claims.

This non-provisional application claims priority under 35 U.S.C. §119 (a) on Patent Application No. 2009-159307 filed in Japan on Jul. 3, 2009, which is entirely herein incorporated by reference.

What is claimed is:

1. A dynamic light-scattering measuring apparatus (10) suitable for measuring a particle size of particles ($S_1$) contained in a medium ($S_2$) as a dispersion containing particles having particle sizes smaller than 100 nm or a dispersion in a multi-disperse state including having particle sizes smaller than 100 nm, the apparatus comprising:
a Mach-Zehnder interferometer having:
  a low-coherence light source (1) for emitting low-coherence light,
  a first photocoupler (3) for dividing light emitted from the low-coherence light source (1) into two pieces, thereby one of the divided pieces of light to be used as a reference light, the other divided piece of light to be used as a scattering light through the dispersion (S) containing the particles ($S_1$),
  a light collecting device made of an objective lens (12) for collecting the scattering light from the dispersion (S),
  a second photocoupler (4) for combining the divided pieces of light.

2. The dynamic light-scattering measuring apparatus as described in the above claim 1, further comprising a phase modulator provided in a way of the path for the reference light.

3. A method for measuring light-scattering intensity of particles in a medium, comprising the steps of:
providing a Mach-Zehnder interferometer as claimed in claim 1;
providing a dispersion containing particles having particle sizes smaller than 100 nm or a dispersion in a multi-disperse state including particles having particle sizes smaller than 100 nm, and
measuring light-scattering intensity from light emitted from the low-coherence light source to define the size of the particles contained in the dispersion, in accordance with a dynamic light-scattering intensity measuring process, the process including the following steps:
emitting low-coherence light from the light-coherence light source,
dividing the low-coherence light into two pieces with the first photocoupler (3), thereby one of the divided pieces of light to be used as a reference light, the other divided piece of light to be used as a scattering light through the dispersion (S) containing the particles ($S_1$),
collecting the scattering light given for the dispersion (S) with the light collecting device made of an objective lens (12), and
combining the divided pieces of light with the second photocoupler.

* * * * *